United States Patent [19]

Dussoubs et al.

[11] Patent Number: 4,565,848
[45] Date of Patent: Jan. 21, 1986

[54] PROCESS FOR THE PREPARATION OF POLYACETYLENES BY DEHYDROCHLORINATION OF POLYVINYL CHLORIDE, THE PRODUCTS OBTAINED AND THEIR APPLICATIONS, IN PARTICULAR, AS SEMICONDUCTORS

[75] Inventors: Daniele Dussoubs; Alain Perichaud; Louis Savidon, all of Marseilles, France

[73] Assignee: Universite d'Aix-Marseille II, Marseilles, France

[21] Appl. No.: 478,530

[22] PCT Filed: Jun. 29, 1982

[86] PCT No.: PCT/FR82/00112
§ 371 Date: Jun. 9, 1982
§ 102(e) Date: Jun. 9, 1982

[87] PCT Pub. No.: WO83/00152
PCT Pub. Date: Jan. 20, 1983

[30] Foreign Application Priority Data

Jun. 30, 1981 [FR] France .................................. 81 13286

[51] Int. Cl.$^4$ ............................................... C08F 0/00
[52] U.S. Cl. .................................. 525/331.5; 525/366
[58] Field of Search ............................. 525/366, 331.5

[56] References Cited

U.S. PATENT DOCUMENTS 3,896,091 7/1975 Fabris et al. .......................... 525/386
4,423,193 12/1983 Melby et al. .......................... 525/340

OTHER PUBLICATIONS

"Dehydrochlorination of Polyvinyl Chloride with Potassium Tertiary Butylate in Tetrahydrofuran", C. R. Academy of Science, Paris, 281, Perichaud et al., 1975, 991–993.

*Primary Examiner*—Joseph L. Schofer
*Assistant Examiner*—Bernard Lipman
*Attorney, Agent, or Firm*—Karl F. Ross; Herbert Dubno

[57] ABSTRACT

In this process for the dehydrochlorination of polyvinyl chloride by potassium tertiary butoxide in anhydrous tetrahydrofuran medium, the number of moles of tertiary butoxide reacted is greater than the number of $CH_2CHCl$ units of polyvinyl chloride, this excess being directly related to the presence of oxygen in the anhydrous tetrahydrofuran and leading to a practically complete dehydrochlorination.

Polyacetylenes are thus obtained the UV spectrum of which has a maximum wavelength around 450 nm and the IR spectrum of which has, in addition to the characteristic polyacetylene band at 1020 and 3020 $cm^{-1}$, the characteristic highly conjugated double bond (C=C) band at 1600 $cm^{-1}$; under certain well determined conditions and in the presence of traces of oxygen, products which are close to polyacetylene and which are soluble in polar solvents are obtained.

17 Claims, 2 Drawing Figures

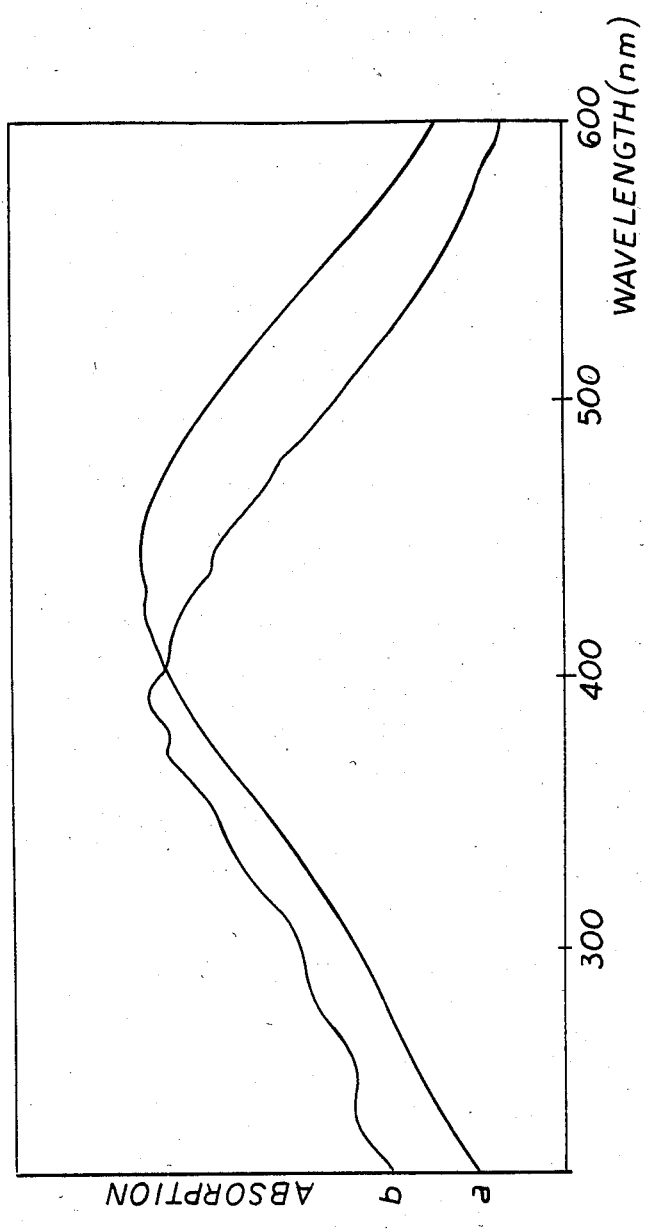

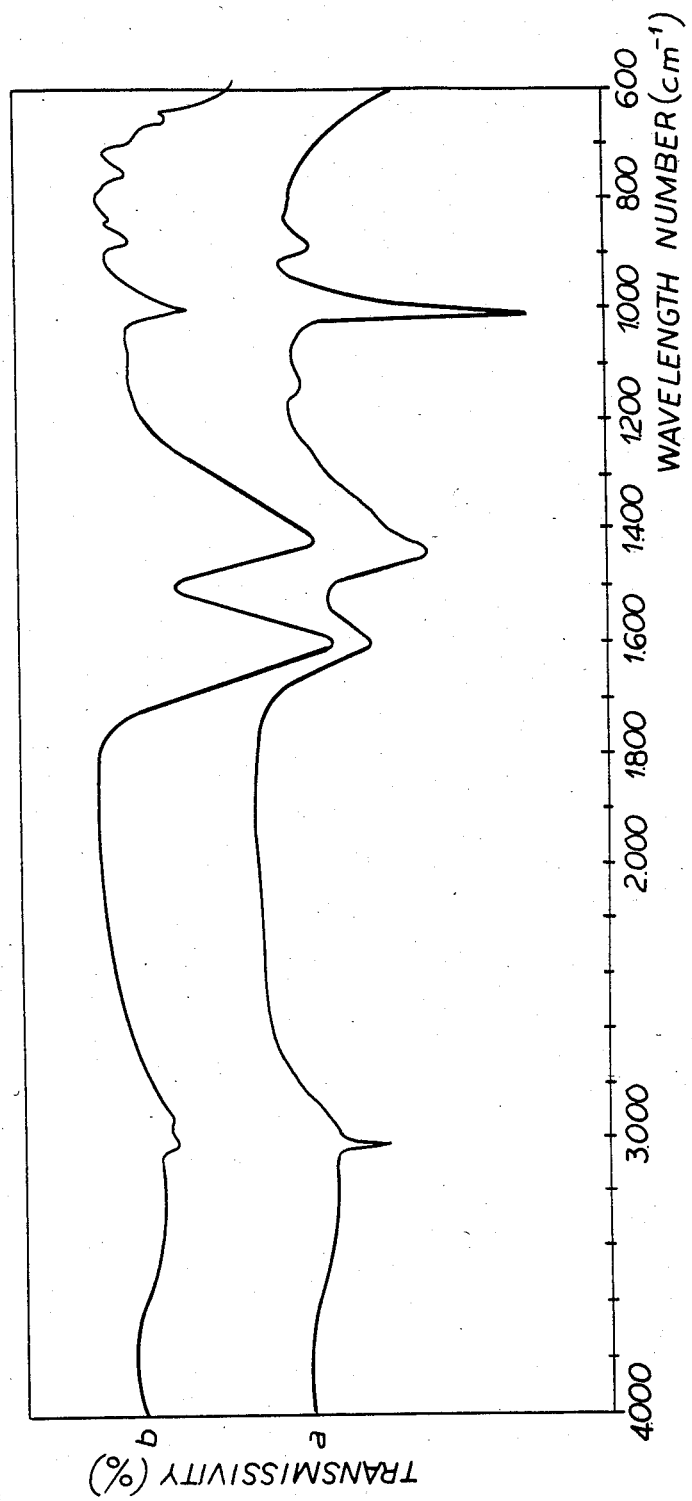
FIG.2 INFRARED SPECTRUM

PROCESS FOR THE PREPARATION OF POLYACETYLENES BY DEHYDROCHLORINATION OF POLYVINYL CHLORIDE, THE PRODUCTS OBTAINED AND THEIR APPLICATIONS, IN PARTICULAR, AS SEMICONDUCTORS

CROSS REFERENCE TO RELATED APPLICATION

This application is a national phase application corresponding to the international application PCT/FR82/00112 filed 29 June 1982 and based upon the French national application 81 13 286 filed 30 June 1981 under the International Convention.

FIELD OF THE INVENTION

This invention relates to a novel process for the preparation of polyacetylenes by dehydrochlorination of polyvinyl chloride, the products obtained by the application of the process and their applications, in particular as semiconductors.

BACKGROUND OF THE INVENTION

It is known that polyacetylenes are polymers showing the repeating unit $+CH=CH+_n$.

There are already different types of polyacetylenes which differ by their molecular weight and the configuration of the conjugated double bond chains in space (G. Natta, G. Mazzanti and P. Corradini, C.R. Acad. Lincei 25, 3, (1958))—(L. B. Luttinger, Chem. Ind. London 1135 (1960))—(M. Hatano, J. Chem. Soc. Japan, Ind. Chem. Sert., 65, 723 (1962)).

These polyacetylenes are compounds that are insoluble in polar solvents, in particular, water and tetrahydrofuran. Up to now, they have been synthesized by polymerization of acetylene H—C≡C—H on a Ziegler-Natta catalyst (H. Shirakawa and S. Ikeda, Polym. J., 2, 231 (1971))—(H. Shirakawa, Japanese patent No. 73, 32581).

Attempts have been further made to carry out the partial chemical dehydrochlorination of polyvinyl chloride; the methods suggested up to now have generally used, as a reactant, alcoholic potassium hydroxide. The percentage dehydrochlorination of the operation barely exceeds 1 to 5%; it is as high as 16% in only one case described by Wirsen and Flodin (J. Appl. Polym. Sc. 22, 3039 (1979)).

Japanese patent application No. 10 590/65 describes a process for obtaining crystalline polyacetylene by copolymerization of vinyl chloride and acetylene in an inert solvent such as acetone in the presence of a catalyst (azodiisobutyronitrile) followed by a dehydrochlorination under highly vigorous conditions using an inorganic base such as sodium hydroxide. The product obtained shows an infrared spectrum with a characteristic band at approximately 1000 cm$^{-1}$.

The inventors have already studied the possibilities of using potassium tertiary butoxide (tBuOK) as a dehydrochlorination reagent for PVC (C.R. Acad. Sci. Paris, 281, 991 (1975) and 290, 65 (1980), for the purpose of studying the distribution of molecular weights by gel permeation chromatography and the distribution of polyene sequences of the dehydrochlorinated products by ultraviolet spectroscopy.

tBuOK, which has a high solubility in tetrahydrofuran (THF) (25 g per 100 g) seemed, indeed, to be a very good dehydrochlorinating agent due to its high basicity and the large size of the tBuO$^-$ anion which minimizes chances of substitution.

This work, however, has not led to the complete dehydrochlorination of PVC; it turns out, indeed (C.R. Acad. Sci. Paris, 281, 991 (1975)), that the UV spectrum of the dehydrochlorination product shows, both through its fine structure and UV absorption maximum (385 nm), the particular characteristics of an incomplete dehydrochlorination of PVC.

SUMMARY OF THE INVENTION

In the course of their research, the inventors have noted surprisingly that a judicious choice of experimental conditions provided a dehydrochlorination of polyvinyl chloride of up to 100% and gave polyacetylenes the UV spectrum of which, substantially different from that described above, no longer had a fine structure and showed a wavelength at the absorption maximum of approximately 450 nm.

The invention therefore relates to a process for the dehydrochlorination of polyvinyl chloride using potassium tertiary butoxide in anhydrous tetrahydrofuran medium, the originality of which resides in the fact that the number of moles of potassium tertiary butoxide reacted is greater than the number of polyvinyl chloride —CH$_2$CHCl units, this excess being directly related to the presence of oxygen in tetrahydrofuran.

It is thus possible to obtain a practically complete dehydrochlorination of polyvinyl chloride whatever the order of introduction of the reactants may be.

BRIEF DESCRIPTION OF THE DRAWING

The above and other objects, features and advantages of the present invention will become more readily apparent from the description of the invention given in detail below reference being had to the accompanying drawing in which FIGS. 1 and 2 are, respectively, ultraviolet and infrared spectra illustrating the invention.

SPECIFIC DESCRIPTION

According to a particular embodiment, all traces of oxygen are removed from the tetrahydrofuran and the number of moles of tertiary butoxide in excess with respect to the number of units of CH$_2$CHCl is approximately 5%.

If the procedure is carried out using anhydrous tetrahydrofuran from which the dissolved oxygen has not been removed, the number of moles of tertiary butoxide in excess with respect to the number of units of CH$_2$CHCl is greater than 5% and, in certain cases, can range from 20 to 40%.

The reaction temperature is also an important factor in the reaction. It is advantageously equal to or less than 30° C.

The inventors have furthermore observed that it was possible, when working at low temperatures, to obtain satisfactory results with tetrahydrofuran from which the dissolved oxygen had not been removed.

According to another embodiment, the reaction temperature is less than −18° C. and the number of moles of tertiary butoxide is greater by approximately 5% than the number of CH$_2$CHCl units.

The concentrations of polyvinyl chloride and tertiary butoxide are limited only by the solubility of these reagents in tetrahydrofuran.

All these factors exert a determining influence on the production of conjugated double bond sequences and lead to a practically complete dehydrochlorination in a relatively short time.

The reaction can be written as follows:

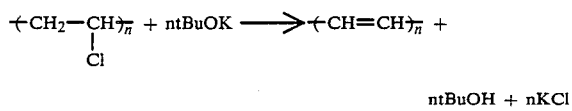

ntBuOH + nKCl

The results of the percentage analysis confirm that the final product obtained is indeed a polyacetylene: 93% carbon and 7% hydrogen, the calculated results being 92.3% carbon and 7.7% hydrogen.

The ultraviolet spectrum of the product in THF shows indeed, as mentioned above, the absorption band characteristic of conjugated double bond chains with an absorption maximum at approximately 450 nm.

The infrared spectrum shows the band characteristic of very highly conjugated double bonds (C=C) at 1600 cm$^{-1}$ and the bands characteristic of polyacetylenes at 1020 and 3020 cm$^{-1}$; it no longer shows the signals characteristic of the starting polyvinyl chloride.

The microstructure of the products obtained as powders, under the above described conditions, was studied by scanning electron microscopy. They appear in globular or lamellar form.

The inventors have determined, furthermore, that the lamellar microstructure is favored if 1% of polyethylene glycol is added, without stirring, to the degassed tetrahydrofuran used to dissolve the polyvinyl chloride. The molar excess of potassium tertiary butoxide is preferably 20% with respect to the number of units of polyvinyl chloride.

These differences in structure can advantageously be applied usefully in a subsequent doping operation.

As already mentioned above, the presence or absence of oxygen in tetrahydrofuran is crucial as regards the properties of the product finally obtained. The inventors have thus determined that, when the reaction occurs in the presence of oxygen, it is possible to obtain, under very precise conditions, products which are close to polyacetylene, but which have characteristics that are different such as good solubility in polar solvents, in particular, water and tetrahydrofuran. The UV spectra show shorter polyene sequences and the infrared spectra show a widening of the C=C band due to conjugation with the C=O band.

The invention therefore also relates to a practically complete dehydrochlorination process of polyvinyl chloride by introduction, under an inert atmosphere and with stirring, of a solution of potassium tertiary butoxide in anhydrous tetrahydrofuran, into a solution of polyvinyl chloride in anhydrous tetrahydrofuran at a concentration ranging from 1 to 4 g/liter and, preferably, of 2.5 g/liter at a temperature ranging from 20° to 35° C. and preferably at a temperature of 25° C., the number of moles of potassium tertiary butoxide in excess with respect to the number of units of CH$_2$CHCl of polyvinyl chloride reacted being approximately 10%.

It is possible to extract the final product of the reaction from the tetrahydrofuran and to transfer it into a water solution at a concentration which can indeed be greater than that in the THF.

The polymers involved have a molecular weight which is much greater than that of PVC, their polydispersity being very low.

These products have, in addition, a satisfactory solubility in polar solvents, in particular, water and tetrahydrofuran, which is a very surprising characteristic for a polymer having such a high apparent molecular weight.

Highly polar polymers are involved (absorption on silica gel).

These polymers are insoluble in hydrocarbons such as pentane, hexane and benzene.

According to another embodiment of the invention, these products, using tetrahydrofuran solutions, can be converted into thin films or recovered as an insoluble black powder by evaporation of the solvent.

The invention also relates to polyacetylenes and other products obtained by using the process described as well as to the applications of these products, in particular, in the field of semiconductors.

SPECIFIC EXAMPLES

This invention, by the way, will be more fully understood and its advantages will appear more clearly from the following description of the various embodiments of the process of the invention which are illustrative of it without, however, limiting it.

EXAMPLE 1

2 g of industrial grade polyvinyl chloride (such as the one commercially available under the trade-mark PVC Solvic 239) were dissolved into 160 ml of anhydrous tetrahydrofuran, freshly distilled twice over sodium and from which the dissolved oxygen had been removed by bubbling argon into the THF during the distillation, at a temperature of 25° C., in a 500 ml flask flushed with a stream of argon.

This flask was provided with a dropping funnel flushed with a stream of argon and contained 3.76 g of tBuOK (freshly sublimed, purity 99.8%) dissolved in 160 ml of THF of the same grade as the one previously used; the tBuOK solution was added to the PVC solution over a 25 mn period with magnetic stirring. The dehydrochlorination reaction of the PVC was rapid. At the end of the addition, 95% of the polyacetylene had been prepared; a yield of 100% was reached by allowing the solution to stir for several hours under argon.

0.83 g of polyacetylene was obtained.

EXAMPLE 2

The reaction conditions were the same as those of Example 1, but the polyvinyl chloride solution in THF was introduced into the tBuOK solution in THF.

EXAMPLE 3

The reaction conditions were the same as those of Example 1, but a non degassed anhydrous THF was used which therefore contained traces of oxygen. An excess of tBuOK of approximately 20% with respect to the stoichiometry had to be used in this case in order to reach the same result.

EXAMPLE 4

The reaction conditions were the same as those of Example 1, but a non degassed anhydrous THF was used which therefore contained traces of oxygen and the reaction was carried out at a temperature below −18° C. An excess of tBuOK of approximately 5% with respect to the stoichiometry had to be used in this case in order to reach the result of Example 1.

EXAMPLE 5

0.4 g of PVC, dissolved in 160 ml of anhydrous THF but containing traces of oxygen was treated in an atmosphere of nitrogen or dry air with 0.788 g of tBuOK (10% excess with respect to the stoichiometry) dissolved in 160 ml of THF of the same grade. At the end of the addition (25 mn) 70% of the chlorine had been eliminated and after 24 hours, a percentage elimination of 93% was reached.

A product was obtained in which the C and H content differed little from that of polyacetylene and which showed good solubility in polar solvents, in particular water and THF, which is an entirely novel characteristic.

The product can be obtained as a film from the THF solution. The product is obtainable as an insoluble powder according to one of the following processes:
  evaporation of the final reaction solution;
  precipitation of the product contained in the reaction solution with a non solvent such as pentane, followed by evaporation of the solvents.

EXAMPLE 6

The inventors repeated the conditions described in one of their previous publications (C.R. Acad. Sci. Paris 290, 65, 1980) but multiplied the quantity of tBuOK by 5 in order to attempt to increase the percentage dehydrochlorination from 20% to 100% and to find the results obtained in Example 5.

0.8 g of PVC were dissolved in 160 ml of THF under reflux over potassium and then distilled under nitrogen in a 500 ml flask provided with a dropping funnel and a magnetic stirring device flushed by a stream of nitrogen.

The dropping funnel therefore did not contain 0.285 g of tBuOK (99.8% purity) but 5 times that amount, i.e., 1.425 g dissolved in 160 ml of THF, under reflux over potassium and then distilled under nitrogen.

The addition of this reagent leads to the formation of a precipitate which is insoluble in water and THF and which does not have the characteristics of the products obtained according to Example 5.

The appended diagram shows, in FIG. 1, the UV spectra of the products obtained according to Examples 1 to 4 (ref. a) and according to Example 5 (ref. b) and in FIG. 2, the IR spectra of these same products designated by the same references.

We claim:

1. A process for the dehydrochlorination of polyvinyl chloride with potassium tertiary butoxide in anhydrous tetrahydrofuran medium, characterized in that the number of moles of tertiary butoxide reacted is greater than the number of $CH_2CHCl$ units of polyvinyl chloride, this excess being directly related to the presence of oxygen in the anhydrous tetrahydrofuran and leading to a practically complete dehydrochlorination.

2. A process according to claim 1, characterized in that the dehydrochlorination is effected by the introduction of the tertiary butoxide solution into the polyvinyl chloride solution.

3. A process according to claim 1, characterized in that the dehydrochlorination is carried out by introduction of the polyvinyl chloride solution into the tertiary butoxide solution.

4. A process according to claim 1, characterized in that the tetrahydrofuran is free of any trace of oxygen and in that the number of moles of tertiary butoxide in excess with respect to the number of $CH_2CHCl$ units is equal to or less than 5%.

5. A process according to claim 1, characterized in that the tetrahydrofuran is free of any trace of oxygen and in that the tetrahydrofuran used to dissolve the polyvinyl chloride contains approximately 1% of polyethylene glycol, the number of moles of potassium tertiary butoxide in excess with respect to the number of $CH_2CHCl$ units being approximately 20%.

6. A process according to claim 1, characterized in that the tetrahydrofuran contains traces of oxygen and in that the number of moles of tertiary butoxides in excess with respect to the number of $CH_2CHCl$ units is greater than 5%.

7. A process according to claim 6, characterizied in that the number of moles of tertiary butoxide in excess with respect to the number of $CH_2CHCl$ units ranges from 20 to 40%.

8. A process according to claim 1 characterized in that the reaction temperature is equal to or less than 30° C.

9. A process according to claim 1 characterized in that the reaction temperature is less than $-18°$ C. and the number of moles of tertiary butoxide in excess with respect to the number of $CH_2CHCl$ units is approximately 5%.

10. A process according to claim 1, characterized in that the concentrations of polyvinyl chloride and tertiary butoxide are limited only by the solubility of these reactants in the tetrahydrofuran.

11. A process according to claim 1, characterized in that a solution of potassium tertiary butoxide in anhydrous tetrahydrofuran containing traces of oxygen is introduced, under an inert atmosphere and with stirring, into a solution of polyvinyl chloride in anhydrous tetrahydrofuran containing traces of oxygen at a concentration equal to approximately 2.5 g/liter and at a temperature of approximately 25° C., the number of moles of potassium tertiary butoxide in excess with respect to the number of $CH_2CHCl$ units of polyvinyl chloride reacted being approximately 10%.

12. A process according to claim 11, characterized in that it consists in taking the final reaction solution in tetrahydrofuran, pouring it slowly into a vessel containing the same volume of water, with stirring, in evaporating the tetrahydrofuran under vacuum first at room temperature and then at approximately 60° C. so as to obtain a product in aqueous solution.

13. A process according to claim 11, characterized in that it consists in evaporating the final reaction solution in order to obtain an isoluble powder.

14. A process according to claim 11, characterized in that it consists in precipitating the product contained in the reaction solution with a non solvent such as pentane and in then carrying out the evaporation of solvents so as to obtain an insoluble powder.

15. The polyacetylenes obtained through application of the process according to claim 1, characterized in that their UV spectrum has a maximum wavelength of approximately 450 nm, in that their IR spectrum has, in addition to the characteristic polyacetylene bands at 1020 and 3020 cm$^{-1}$, the band characteristic of highly conjugated double bonds (C=C) at 1600 cm$^{-1}$.

16. The products obtained through application of the process according to claim 11, characterized in that they are soluble in polar solvents, in particular, water and tetrahydrofuran, they have a polar character and are insoluble in hydrocarbons such as pentane, hexane and benzene.

17. The products obtained through application of the process according to claim 11, characterized in that they are in the form of a thin film or an insoluble powder.

* * * * *